(12) United States Patent
Yamamoto

(10) Patent No.: US 6,542,697 B1
(45) Date of Patent: Apr. 1, 2003

(54) CAMERA HAVING LIGHT EMISSION UNIT

(75) Inventor: Harushige Yamamoto, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 09/655,356

(22) Filed: Sep. 5, 2000

(30) Foreign Application Priority Data

Sep. 8, 1999 (JP) ............................................ 11-254306
Nov. 16, 1999 (JP) ............................................ 11-326024

(51) Int. Cl.[7] ............................................. G03B 15/03
(52) U.S. Cl. ...................................................... 396/177
(58) Field of Search ................................. 396/175, 176, 396/177, 178

(56) References Cited

U.S. PATENT DOCUMENTS 6,222,997 B1 * 4/2001 Ebe ............................ 396/177

* cited by examiner

Primary Examiner—Russell Adams
Assistant Examiner—Arthur A Smith
(74) Attorney, Agent, or Firm—Robin, Blecker & Daley

(57) ABSTRACT

A camera includes a light emission unit having a light emitting part, an operation member provided for changing over the camera between an operative state and an inoperative state, a moving member coupled to the operation member and arranged to move in an operating direction in which the operation member is operated, the moving member having a cam groove formed therein, and a rotary member having an engaging part engaging the cam groove and arranged to be rotated around an axis parallel with the operating direction by the engaging part sliding along the cam groove, wherein the light emission unit is rotated around the axis in association with rotation of the rotary member, so that the light emission unit is changed over between a state in which the light emission unit is stowed in the camera and a state in which the light emission unit is protruded from the camera.

5 Claims, 3 Drawing Sheets

CAMERA HAVING LIGHT EMISSION UNIT

BACKGROUND OF THE INVENTION

1. Field of the Invention

The present invention relates to an optical apparatus, such as a camera, having a light emission unit arranged to be protrusible and stowable.

2. Description of Related Art

In a conventional optical apparatus, such as a compact camera, when a main switch is operated, the supply of electric power is started and, accordingly, a lens barrel is drawn out from its stowed position. Then, with the drawing-out motion of the lens barrel used as a drive source, a flash device, which has been stowed in the body of the camera, is caused to protrude, or pop up, to permit flash photography to be carried with the flash device used.

However, the above-mentioned conventional camera necessitates use of an interlocking mechanism for driving the flash device to protrude in association with the drawing-out motion of the lens barrel. The interlocking mechanism makes the structural arrangement of the camera complex to incur an increase in cost. Besides, the interlocking mechanism, which is arranged between the lens barrel which is disposed in the middle of the camera body and the flash device which is, in most cases, disposed at an upper part of the camera body near to one side thereof, requires a large space within the camera to hinder a reduction in size of the camera.

Further, since the flash device is arranged to be driven to protrude by utilizing the driving force on the lens barrel, the energy consumed for driving the flash device to protrude lowers the drawing-out force of the lens barrel. Hence, there is a possibility that the driving arrangement for the flash device brings about some problems in respect of the drawing-out driving action on the lens barrel.

In addition, in U.S. patent application Ser. No. 09/054,990 filed on Apr. 3, 1998 (corresponding to Japanese Laid-Open Patent Application No. Hei 10-288807), there is disclosed a camera in which a light emitting part of the flash device is mechanically interlocked with an operation switch provided for starting the supply of electric power to the camera and is made to protrude or to be stowed in the same direction as a direction in which the operation switch is operated.

BRIEF SUMMARY OF THE INVENTION

It is a first object of the invention to provide a camera capable of changing over a flash device between a light-emission enabled state and a stowed state in association with an operation of an operation member provided for starting or stopping the supply of electric power to the camera.

It is a second object of the invention to provide a camera having a flash device arranged to protrude in a direction perpendicular to an operating direction of an operation member.

To attain the above objects, in accordance with an aspect of the invention, there is provided a camera, which comprises a light emission unit having a light emitting part, an operation member provided for changing over the camera between an operative state and an inoperative state, a moving member coupled to the operation member and arranged to move in an operating direction in which the operation member is operated, the moving member having a cam groove formed therein, and a rotary member having an engaging part engaging the cam groove and arranged to be rotated around an axis parallel with the operating direction by the engaging part sliding along the cam groove, wherein the light emission unit is rotated around the axis in association with rotation of the rotary member.

Further, in the camera, the rotary member has a first rotary member and a second rotary member, the first rotary member and the second rotary member being connected to each other by an elastic member.

Further, in the camera, the first rotary member has the engaging part, and the light emission unit is driven by a rotating force of the second rotary member obtained through the elastic member.

Further, in the camera, the elastic member is a spring.

Further, in the camera, the operation member is a switch of sliding type.

These and other objects and features of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings.

Figure 4A:
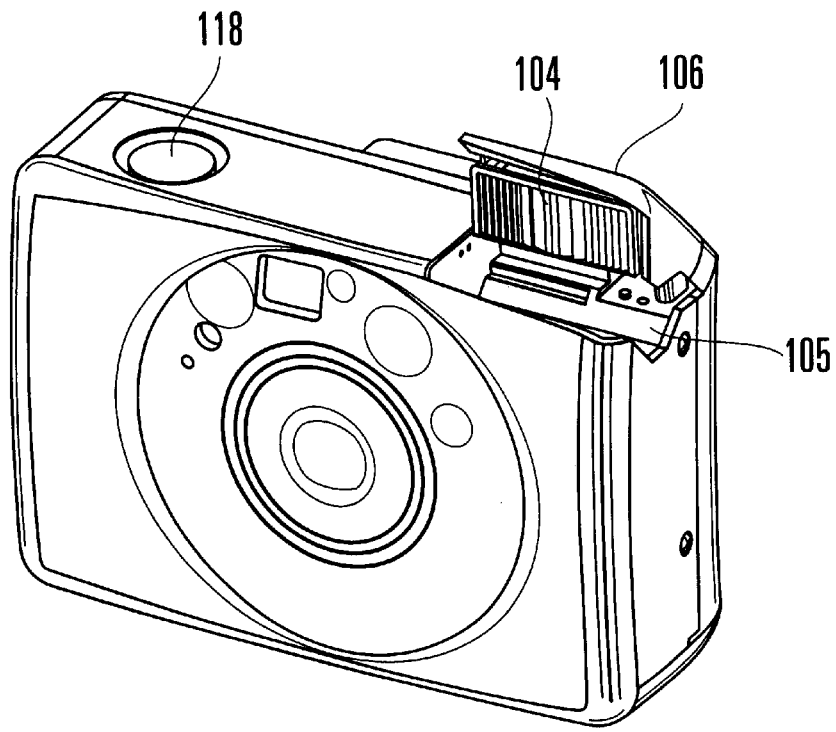
FIGS. 4(*a*) and 4(*b*) are perspective views showing the appearance of the camera.
Figure 4B:
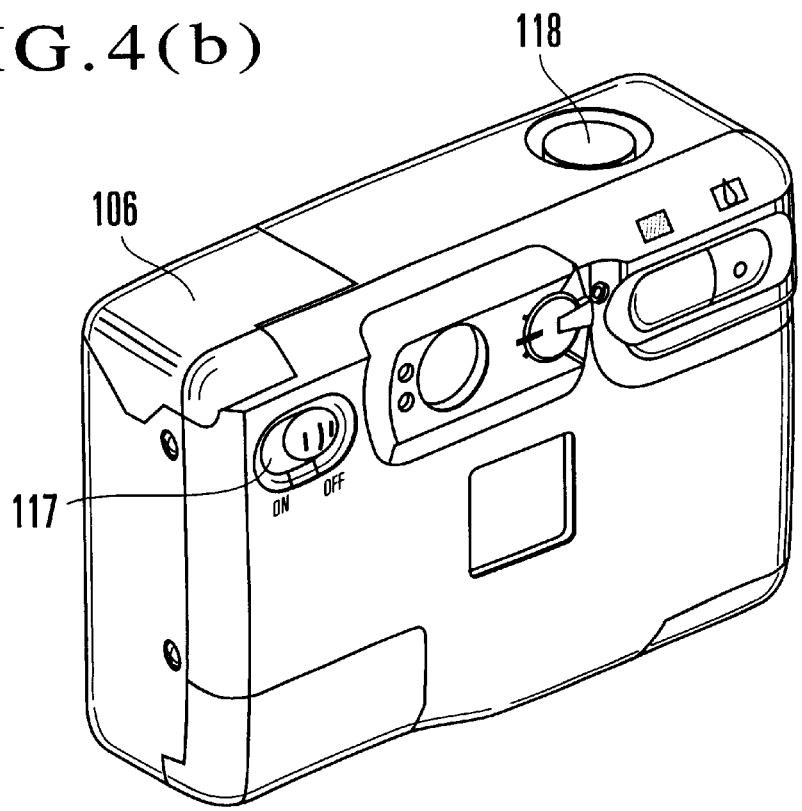

FIGS. 4(*a*) and 4(*b*) are perspective views showing the appearance of a camera (an optical apparatus) according to the embodiment of the invention. FIG. 4(*a*) shows the front side of the camera in a state in which a flash light emission unit is popped up from the body of the camera with the power supply of the camera turned on. FIG. 4(*b*) shows the rear side of the camera in a state in which the flash light emission unit is stowed inside the camera body with the power supply of the camera turned off.

The user of the camera starts or stops the supply of electric power to the camera by operating, to the right or left, a main switch 117 provided on the camera body. For example, the user turns on the power supply by operating the main switch 117 to the left, as viewed in FIG. 4(*b*), and, after that, operates a release button 118 to take a shot.

Figure 1:
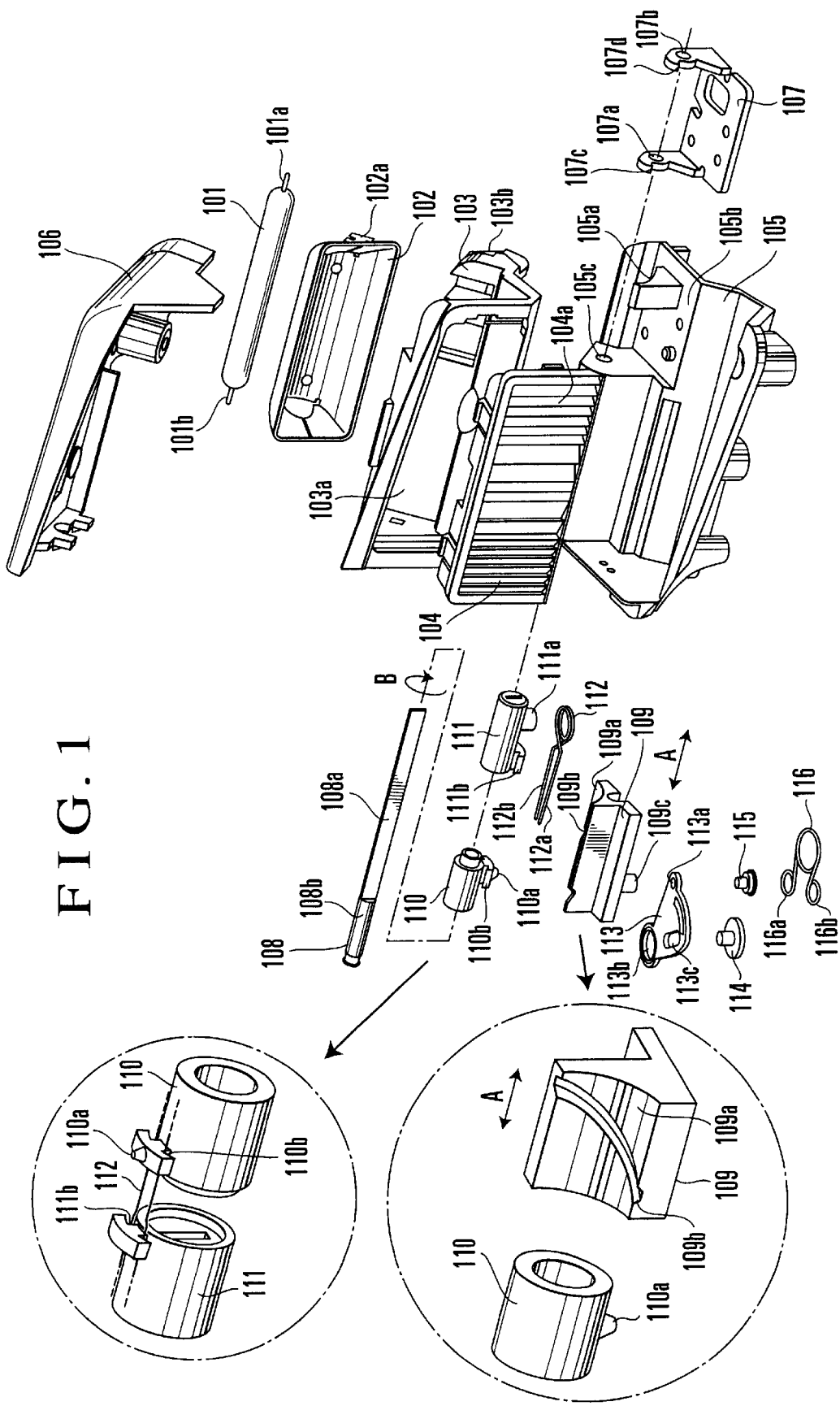
FIG. 1 is an exploded perspective view showing the arrangement of a light emission unit driving mechanism included in a camera according to an embodiment of the invention.

FIG. 1 is an exploded perspective view showing a light emitting unit driving mechanism arranged in the camera to move the flash light emission unit between a protruded position and a stowed position.

Referring to FIG. 1, a light emitting tube (xenon tube) 101 has a xenon gas sealed therein. A reflector 102 is arranged to efficiently illuminate an object of shooting with flash light emitted from the light emitting tube 101. The light emitting tube 101 is secured to the reflector 102 in a predetermined position with an elastic member (not shown), such as a silicone rubber. The light emitting tube 101 and the reflector 102 are arranged inside a flash-device case 103.

A Fresnel lens 104 is formed with a transparent resin. To control the illumination with the flash light mainly in the horizontal direction, the Fresnel lens 104 has a plurality of Fresnel parts 104a arranged in the vertical direction as viewed in FIG. 1. The Fresnel lens 104 is secured to the front part of the flash-device case 103 in such a way as to cover an aperture part 103a of the flash-device case 103.

Wires from a flash-device booster circuit (not shown) are connected by soldering or the like to terminal parts 101a and 101b which protrude from the two sides of the light emitting tube 101. A wire from a trigger circuit (not shown) is connected by soldering or the like to a trigger terminal 102a of the reflector 102. These wires are arranged to extend, through a wiring hole (not shown) provided in the flash-device case 103 and further through a wiring hole 105a provided in a flash-device base plate 105, to a circuit board (not shown) provided on the camera body.

A flash-device cover 106 is arranged as an upper cover of a light emitting part, which is composed of the light emitting tube 101, the reflector 102 and the Fresnel lens 104. The flash-device cover 106 is secured to the flash-device case 103 with a fastening means such as a screw.

Further, the arrangement described above enables the flash light emission unit to be moved to protrude and to be stowed from and into the camera body, as will be described later herein.

A hinge plate 107 is secured, with a coupling means such as screws, to a mount part 105b of the flash-device base plate 105, which is fixed to the camera body.

A hinge shaft 108 has a two-side-cutaway part 108a formed in a part thereof. The hinge shaft 108 pierces through a holding hole (not shown) formed in the flash-device base plate 105 and a holding hole 105c formed coaxially with the holding hole (not shown).

The hinge shaft 108 pierces further through two holding holes 107a and 107b formed in the hinge plate 107, which is secured to the flash-device base plate 105. Here, the diameters of the holding holes 105c and 107a are arranged to be a little larger than the diameter of the hinge shaft 108. Therefore, when the hinge shaft 108 is rotatably held by the holding hole (not shown) of the flash-device base plate 105 and the holding hole 107b of the hinge plate 107, the holding holes 105c and 107a do not hinder the rotating motion of the hinge shaft 108.

Further, the holding holes 107a and 107b are formed in two raised parts which rise from the lower surface of the hinge plate 107.

In an assembled state of the flash-device case 103, the lower part of the flash-device case 103 is located between the two holding holes 107a and 107b of the hinge plate 107. Then, the two-side-cutaway part 108a of the hinge shaft 108 is fitted in a fitting hole (not shown) formed in the flash-device case 103, so that the flash-device case 103 is prevented from moving in the direction of rotation with respect to the hinge shaft 108.

In other words, in the assembled state of the flash-device case 103, the flash-device case 103 (the flash light emission unit) is arranged to rotate integrally with the hinge shaft 108.

Further, there are formed projections 107c and 107d at the fore ends of the two raised parts of the hinge plate 107. In the flash-device case 103, there are formed two recessed parts 103b (one of them being not shown), which are arranged to come into contact with the projections 107c and 107d in the direction of rotation in such a way as to determine the protruded position and the stowed position of the flash light emission unit.

The arrangement described above enables the flash light emission unit to rotate integrally with the hinge shaft 108 to degrees set on the flash-device base plate 105 in the directions of protruding and stowing.

A cam member 109 is supported to be slidable to a predetermined extent between the holding hole (not shown) and the holding hole 105c formed in the flash-device base plate 105, in the direction of the center axis of the hinge shaft 108, i.e., in the directions of arrows A shown in FIG. 1.

The cam member 109 has a cylindrical surface 109a formed coaxially with the center axis of the hinge shaft 108. In the cylindrical surface 109a, there is formed a helical cam groove 109b.

The main switch 117, which is arranged to change over the camera between an operative state (having the power supply turned on) and an inoperative state (having the power supply turned off), is coupled to the cam member 109. Accordingly, when the main switch 117 is operated to move its position, the cam member 109 moves in the same direction in which the main switch 117 is operated, i.e., in the direction of one of the arrows A, in association with the movement of the main switch 117.

A cam follower member 110 is located between the holding hole (not shown) and the holding hole 105c of the flash-device base plate 105, in an assembled state thereof, and is supported by a cylindrical part 108b of the hinge shaft 108 in such a way as to be rotatable relative to the hinge shaft 108. While the cam follower member 110 is rotatable relative to the hinge shaft 108, the phase of rotation of the cam follower member 110 is decided by the moving position of the cam member 109 as an engaging projection 110a formed on the cam follower member 110 is relatively-slidably engaging the cam groove 109b of the cam member 109.

A rotation transmitting member 111 is located, similarly to the cam follower member 110, between the holding hole (not shown) and the holding hole 105c of the flash-device base plate 105 in an assembled state thereof, and is fitted on the two-side-cutaway part 108a of the hinge shaft 108 in such a way as to be rotatable integrally with the hinge shaft 108.

An external-force absorbing spring 112 is mounted on a spring holding part 111a of the rotation transmitting member 111. The external-force absorbing spring 112 has two arm parts 112a and 112b arranged to pinch and hold together a part 110b formed on the cam follower member 110 and a part 111b formed on the rotation transmitting member 111. The cam follower member 110 and the rotation transmitting member 111 are thus arranged to be rotatable together within a range of the pinching force of the external-force absorbing spring 112.

In other words, when the rotation phase of the cam follower member 110 is decided by the moving position of the cam member 109 as mentioned above, the rotation phase of the rotation transmitting member 111 is also decided through the external-force absorbing spring 112.

With the light emission unit driving mechanism arranged in the manner described above, when the main switch 117 is operated to be moved from such a position as to render the camera inoperative to such a position as to render the camera operative, the cam member 109 moves in the direction of one of the arrows A in association with the movement of the main switch 117.

When the cam member 109 moves in the direction of one of the arrows A, an increase in lift of the cam groove 109b causes the cam follower member 110 to rotate in the direction of an arrow B shown in FIG. 1. Then, the rotation transmitting member 111, which is coupled to the cam member 109 through the external-force absorbing spring 112, and the hinge shaft 108, which is fitted into the rotation transmitting member 111, also rotate in the same direction together. With the hinge shaft 108 rotated, the flash-device case 103 (i.e., the flash light emission unit) connected integrally with the hinge shaft 108, rotates around the hinge shaft 108 from the stowed position to the protruded position.

When the main switch 117 is operated to be moved from the position to render the camera operative to the position to render the camera in operative, on the other hand, the cam member 109 moves in the direction of the other of the arrows A in association with the movement of the main switch 117.

When the cam member 109 moves in the direction of the other of the arrows A, a decrease in lift of the cam groove 109b causes the cam follower member 110 to rotate in a direction reverse to the direction of the arrow B shown in FIG. 1. Then, the rotation transmitting member 111, which is coupled to the cam member 109 through the external-force absorbing spring 112, and the hinge shaft 108, which is fitted into the rotation transmitting member 111, also rotate in the same direction together. With the hinge shaft 108 rotated, the flash-device case 103 (i.e., the flash light emission unit) connected integrally with the hinge shaft 108, rotates around the hinge shaft 108 from the protruded position to the stowed position.

In a case where an external force is exerted, for example, on the flash light emission unit, while it is in the protruded position, in the direction of pushing it into the camera body, the flash light emission unit, the hinge shaft 108 and the rotation transmitting member 111 rotate together in the direction reverse to the direction of the arrow B.

However, since the phase of the cam follower member 110 in the direction of rotation is decided by the cam groove 109b of the cam member 109, the cam follower member 110 cannot rotate together with the rotation transmitting member 111 in the direction reverse to the direction of the arrow B.

In this instance, the external-force absorbing spring 112 resiliently deforms to stretch and expand a distance between the two arm parts 112a and 112b, thereby causing the phase of the rotation transmitting member 111 to deviate from the phase of the cam follower member 110 in the direction reverse to the direction of the arrow B. The external force is thus allowed to escape by the external-force absorbing spring 112. Therefore, the external force is prevented from being transmitted from the side of the rotation transmitting member 111 (the flash light emission unit) to the side of the cam follower member 110 (the cam member 109 and the main switch 117).

When the flash light emission unit is released from the external force exerted thereon, the external-force absorbing spring 112 resumes its original shape. With the original shape of the external-force absorbing spring 112 resumed, the flash light emission unit comes back to the protruded position. Then, the rotation transmitting member 111 and the cam follower member 110 become rotatable in an in-phase manner again.

In a case where an external force is exerted on the flash light emission unit, while it is in the stowed position, in the direction of pulling it out from the camera body, the external force is also allowed to escape in the same manner as described above. Therefore, the external force is also prevented from being transmitted from the side of the rotation transmitting member 111 (the flash light emission unit) to the side of the cam follower member 110 (the cam member 109 and the main switch 117).

In the case of the present embodiment, the light emission unit driving mechanism is arranged to be capable of shifting the phase of the rotation transmitting member 111 in either of the directions of rotation with respect to the phase of the cam follower member 110. Accordingly, the light emission unit driving mechanism can be reliably protected from external forces in cases where an external force is exerted to forcibly push the flash light emission unit from the protruded position into the camera body, where an external force is exerted to forcibly pull the flash light emission unit from the stowed position, and where an external force is exerted to pull the flash light emission unit further outward from the protruded position.

A toggle-spring holding plate 113 is held by a screw 114 on the flash-device base plate 105 in such a way as to be rotatable around a circular hole 113b. The toggle-spring holding plate 113 is provided with a caulking hole 113a, at which a caulking pin 115 is caulked.

A toggle spring 116 has its one arm end 116a held by the caulking pin 115 caulked to the toggle-spring holding plate 113. The other arm end 116b of the toggle spring 116 is held by a spring hooking part 105d (see FIG. 2) which is formed on the flash-device base plate 105. The toggle-spring holding plate 113 is provided further with a slot 113c. The slot 113c is arranged to exert a biasing force of the toggle spring 116 on the cam member 109 by slidably engaging an engaging projection 109c formed at a lower part of the cam member 109.

Figure 2:
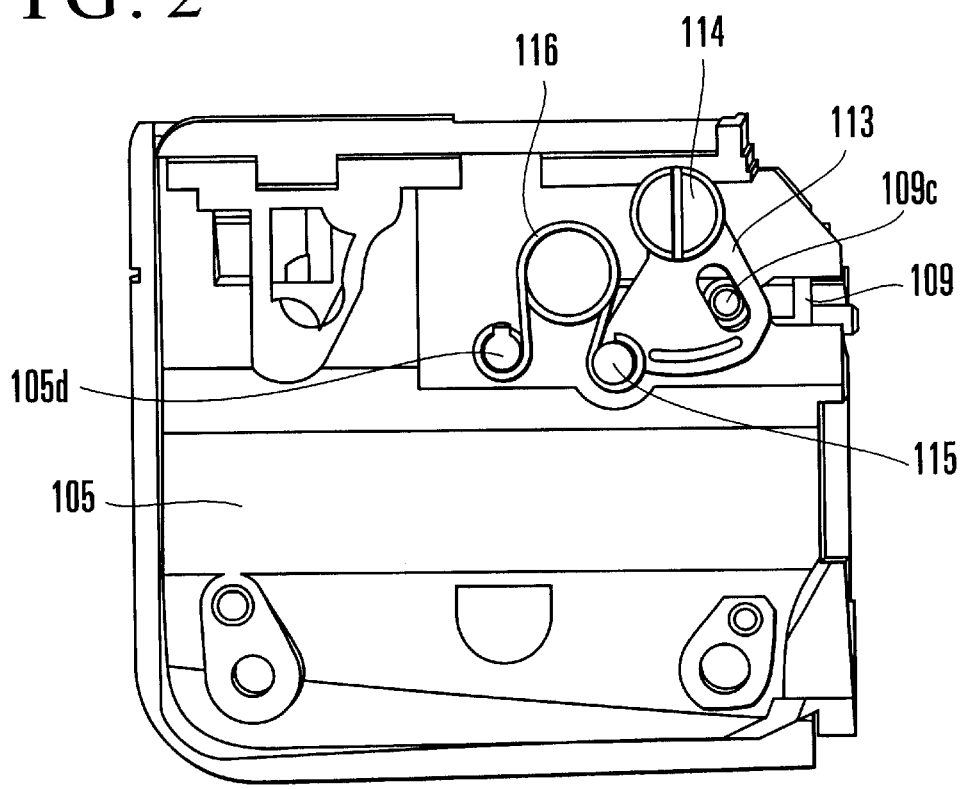
FIG. 2 is a diagram showing the light emission unit driving mechanism in a state of having a flash device in its stowed position, as viewed from below the camera.
Figure 3:
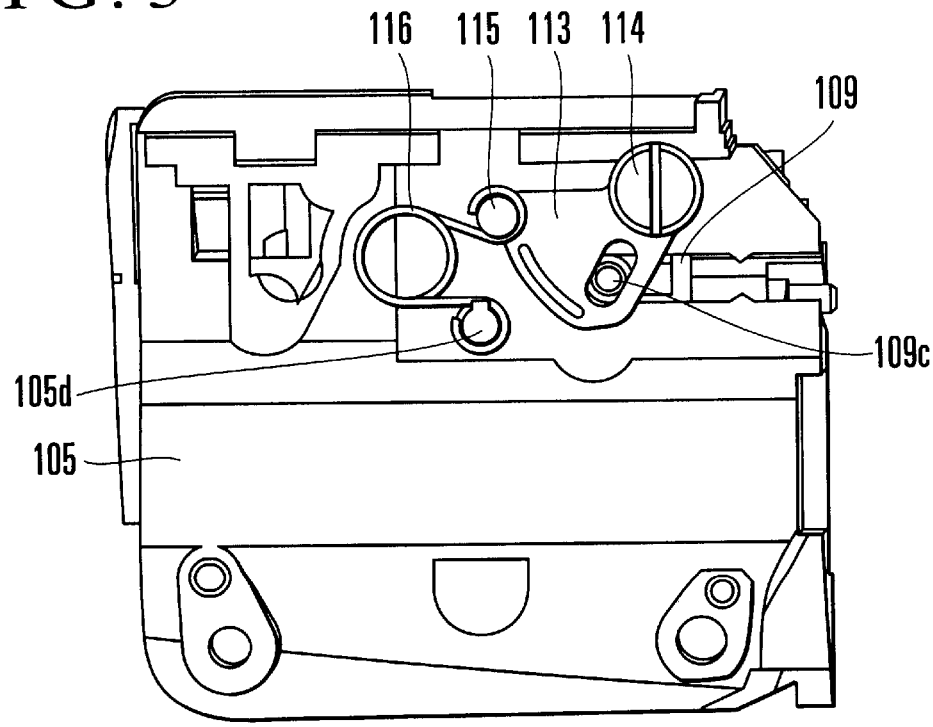
FIG. 3 is a diagram showing the light emission unit driving mechanism in a state of having the flash device in its protruded position, as viewed from below the camera.

FIGS. 2 and 3 show the light emission unit driving mechanism as viewed from below the camera. More specifically, FIG. 2 shows the state of the light emission unit driving mechanism when the flash light emission unit is in the stowed position, and FIG. 3 shows the state of the light emission unit driving mechanism when the flash light emission unit is in the protruded position.

Referring to FIG. 2, a biasing force directed to the right as viewed in FIG. 2 is constantly applied, by the action of the toggle spring 116, to the engaging projection 109c of the cam member 109 through the toggle-spring holding plate 113. By this arrangement, the flash light emission unit is elastically held at the stowed position through the cam member 109.

In the case of FIG. 3, a biasing force directed to the left as viewed in FIG. 3 is constantly applied, by the action of the toggle spring 116, to the engaging projection 109c of the cam member 109 through the toggle-spring holding plate 113. By this arrangement, the flash light emission unit is elastically held at the protruded position through the cam member 109.

In other words, when the main switch 117 is operated, the main switch 117 and the cam member 109 move against the urging force of the toggle spring 116 up to a midway point in the moving direction, i.e., until the toggle spring 116 comes to its neutral position. After that, the main switch 117 and the cam member 109 move with the aid of the urging force of the toggle spring 116. After reaching the end of the movement, the main switch 117 and the cam member 109 are kept at the end of the movement by the urging force of the toggle spring 116.

The above-stated arrangement not only keeps the light emission unit driving mechanism and the flash light emission unit at the stowed position and the protruded position under the urging force of the toggle spring 116 but also serves to impart a clicking feeling to an operation on the main switch 117.

The invention is not limited to the arrangement of the light emission unit driving mechanism described in the above embodiment. The invention is applicable also to any other apparatus as long as the apparatus includes a cam member arranged to move in association with the movement of an operation member to change over the state of the apparatus between operative and inoperative states.

In the case of the present embodiment, the invention is applied to a camera having a flash light emission unit arranged to pop up from the upper side of the camera body. However, the invention is applicable also to a case where a flash device is arranged to protrude from one side of the camera body.

In the case of the present embodiment, the invention is applied to a camera having a flash light emission unit. However, the invention is applicable also to an optical apparatus other than a camera as long as the optical apparatus is provided with a light emission unit for emitting light for illumination.

According to the invention, as described above, the flash light emission unit is rotated to a protruded position or a stowed position by means of a cam member which is arranged to be moved by the operating force on an operation member such as a main switch. Unlike the conventional optical apparatus, therefore, the flash light emission unit can be moved to protrude and to be stowed without lowering a force of drawing out the lens barrel.

In addition, the operation member is disposed on the camera body in the neighborhood of the flash light emission unit. Therefore, the light emission unit driving mechanism can be compactly arranged to permit a reduction in size of the camera.

Further, in a case where an external force is exerted on the flash light emission unit in the direction of its rotation, the light emission unit driving mechanism prevents the external force from being transmitted from the side of the flash light emission unit to the side of the operation member. This arrangement effectively prevents the light emission unit driving mechanism from having any excessive load imposed thereon and the operation member from moving.

Further, the urging member is arranged to switch its urging direction at a midway of the moving range of the cam member or the operation member. This arrangement not only reliably keeps the flash light emission unit at the stowed position and the protruded position under the urging force of the urging member but also serves to impart a clicking feeling to an operation on the operation member.

What is claimed is:

1. A camera comprising:

a light emission unit having a light emitting part;

an operation member provided for changing over said camera between an operative state and an inoperative state;

a moving member coupled to said operation member and arranged to move in an operating direction in which said operation member is operated, said moving member having a cam groove formed therein; and a rotary member having an engaging part engaging said cam groove and arranged to be rotated around an axis parallel with the operating direction by said engaging part sliding along said cam groove, wherein said light emission unit is rotated around the axis in association with rotation of said rotary member.

2. A camera according to claim 1, wherein said rotary member has a first rotary member and a second rotary member, said first rotary member and said second rotary member being connected to each other by an elastic member.

3. A camera according to claim 2, wherein said first rotary member has said engaging part, and said light emission unit is driven by a rotating force of said second rotary member obtained through said elastic member.

4. A camera according to claim 2, wherein said elastic member is a spring.

5. A camera according to claim 2, wherein said operation member is a switch of sliding type.

* * * * *